United States Patent
Lv et al.

(10) Patent No.: US 12,478,048 B2
(45) Date of Patent: *Nov. 25, 2025

(54) MARINE ECOLOGICAL ENGINEERING CONSTRUCTION METHOD, ASPHALT CEMENT-BASED COATING, AND PREPARATION METHOD THEREOF

(71) Applicant: Jianfu Lv, Harbin (CN)

(72) Inventors: Jianfu Lv, Harbin (CN); Fei Xu, Harbin (CN); Mingjun Wang, Harbin (CN); Zhenzhen Cao, Harbin (CN)

(73) Assignee: Jianfu Lv, Harbin (CN)

( * ) Notice: Subject to any disclaimer, the term of this patent is extended or adjusted under 35 U.S.C. 154(b) by 726 days.

This patent is subject to a terminal disclaimer.

(21) Appl. No.: 17/830,272

(22) Filed: Jun. 1, 2022

(65) Prior Publication Data
US 2022/0354095 A1   Nov. 10, 2022

Related U.S. Application Data

(63) Continuation of application No. PCT/CN2020/133101, filed on Dec. 1, 2020.

(30) Foreign Application Priority Data

Dec. 2, 2019   (CN) .......................... 201911210405.7
Dec. 2, 2019   (CN) .......................... 201911210495.X

(51) Int. Cl.
*A01K 61/77*   (2017.01)
*A01K 61/54*   (2017.01)
(Continued)

(52) U.S. Cl.
CPC .............. *A01K 61/77* (2017.01); *A01K 61/54* (2017.01); *C04B 18/027* (2013.01);
(Continued)

(58) Field of Classification Search
CPC ..................................................... A01K 61/77
See application file for complete search history.

(56) References Cited

U.S. PATENT DOCUMENTS 2,319,170 A *  5/1943  Toner ..................... A01K 61/54
                                                        119/238
3,853,095 A * 12/1974  Lawrence .............. A01K 61/54
                                                        119/238
(Continued)

FOREIGN PATENT DOCUMENTS

CN        104529286 A      4/2015
CN        107372242 A      11/2017
(Continued)

OTHER PUBLICATIONS

International Search Report of PCT/CN2020/133101 dated Feb. 25, 2021 with English translation, (6p).

*Primary Examiner* — Magdalena Topolski
(74) *Attorney, Agent, or Firm* — Arch & Lake LLP; Hao Tan; Shen Wang

(57) ABSTRACT

A marine ecological engineering construction method, an asphalt cement-based coating, and a preparation method thereof are provided. The asphalt cement-based coating can make discarded concrete have the capacity of inducing the settlement of sessile organisms, achieve the purpose of using discarded concrete to construct ecological engineering, and has the characteristics of discarded object recycling and marine ecological restoration.

10 Claims, 3 Drawing Sheets

(51) Int. Cl.
*C04B 18/02* (2006.01)
*C04B 18/167* (2023.01)
*C04B 41/47* (2006.01)
C04B 103/00 (2006.01)
C04B 103/54 (2006.01)
C04B 111/40 (2006.01)
C04B 111/74 (2006.01)

(52) U.S. Cl.
CPC .......... *C04B 18/167* (2013.01); *C04B 41/478* (2013.01); *C04B 2103/0052* (2013.01); *C04B 2103/54* (2013.01); *C04B 2111/40* (2013.01); *C04B 2111/74* (2013.01)

(56) References Cited

U.S. PATENT DOCUMENTS

| | | | | |
|---|---|---|---|---|
| 4,872,782 A | * | 10/1989 | Streichenberger | A01K 61/75 405/23 |
| 9,926,680 B2 | * | 3/2018 | Boasso | E02B 3/121 |
| 11,598,879 B2 | * | 3/2023 | Tickle | G01S 19/13 |
| 2023/0073789 A1 | * | 3/2023 | Sella | A01K 61/77 |

FOREIGN PATENT DOCUMENTS

| | | | |
|---|---|---|---|
| CN | 107805037 | A | 3/2018 |
| CN | 109467354 | A | 3/2019 |
| CN | 111302727 | A | 6/2020 |
| CN | 111320935 | A | 6/2020 |
| CN | 111321699 | A | 6/2020 |
| JP | 200041525 | A | 2/2000 |

* cited by examiner

Sulfate cement concrete                     Silica fume cement concrete

Main view    Top view

Main view

Top view

MARINE ECOLOGICAL ENGINEERING CONSTRUCTION METHOD, ASPHALT CEMENT-BASED COATING, AND PREPARATION METHOD THEREOF

This application is a continuation of a PCT application with Application Number PCT/CN2020/133101 filed on Dec. 1, 2020, which claims the priority of a Chinese patent application 201911210495.X filed on Dec. 2, 2019 and Chinese patent application 201911210405.7 filed on Dec. 2, 2019, and the entire disclosures of which are incorporated by reference in this application for all purposes.

TECHNICAL FIELD

The present disclosure relates to a marine ecological engineering technology, particularly relates to a construction method for marine ecological engineering, and an asphalt cement-based coating and preparation method thereof, and belongs to the field of marine ecological engineering.

BACKGROUND

In recent decades, the rapid development of coastal economy and neglect of environmental protection have caused large-scale destruction of coastal ecology, and have had a huge impact on the ecology and economy of coastal areas in the world. At present, with the introduction of a series of related national policies, marine engineering construction in the world will come to a peak period, but large-scale marine engineering construction and breakwaters for guaranteeing the stability of surrounding sea areas further destroy the fragile ecosystem of the sea. If appropriate ecological environment protection cannot be performed, larger disasters will be brought to the ecology of the ocean coasts. Meanwhile, most coastal infrastructures cannot be dismantled, and the ecology of the sea areas where the infrastructures are located needs to be restored, people gradually have the consciousness of applying the ecological technology on a large number of infrastructures to effectively improve or restore the ecology of the sea areas. Therefore, it is very important and urgent to construct breakwaters with good ecological effect or perform ecologicalization on existing breakwater to improve the offshore ecological environment at present.

SUMMARY

The present disclosure aims to solve the problem that the coastal ecology is damaged by the extension and restoration of the current breakwater and the current situation that most of the marine sessile organisms are not compactly settled on the surfaces of the current marine concrete engineering and need manual intervention. In the present disclosure, the surface of discarded concrete is treated by a coating technology, and the treated discarded concrete is used for constructing novel marine ecological engineering capable of attracting oyster and other sessile organisms. The novel marine ecological engineering has a good wave absorbing function, brings ecological benefit from the settlement of a large amount of oyster and accordingly solves the problem that it is difficult to treat a large amount of discarded concrete.

The specific technical solution is as follows:

(1) surveying a sea area of a breakwater construction position: surveying dominant species of oysters in the sea area and whether the oysters are attached, surveying air temperature, seawater temperature, dissolved oxygen, plankton, total dissolved inorganic nitrogen, active phosphate, active silicate, $Ca^{2+}$, $Zn^{2+}$, $K^+$ and the like for the sea area at different seasons, and surveying typhoon times, strength and the like over the years;

(2) preparing a concrete settlement substrate: manufacturing a lightweight concrete settlement substrate with a rough surface for oyster, wherein the shape of the concrete oyster settlement substrate is one of the shapes of a slab-shaped settlement substrate, a wave-shaped settlement substrate and a cylindrical settlement substrate;

(3) quantitative collecting and cultivating oyster larvae: placing the settlement substrate in a larva collection area of local sea area, where the swimming larvae are mainly in metamorphosis period, stopping collecting the larvae once the amount of the settled oyster larvae is 15-25 larvae/100 $cm^2$, and then moving the settlement substrate to a sea area with rich baits for floating cultivation;

(4) treating surfaces of discarded concrete blocks: evaluating the alkalinity, the internal ion concentration and the permeability of the discarded concrete; if the pH is more than 12.5, reducing the alkalinity, and spraying or brushing an emulsified asphalt cement-based coating with high bonding strength and high induction for oyster to settle on the surfaces of the concrete blocks;

(5) placing discarded concrete blocks: in the concentration period of settlement and metamorphosis of oyster planktonic larvae in the local sea area of the next year, adopting a dispersed placement method, placing the discarded concrete blocks with volume of more than 1 m3 individually, and covering each rock with a rope; covering multiple discarded concrete blocks with the volume of less than 1 m3 with ropes to form a discarded concrete block pile with a volume of 1-5 m3, wherein the internal voidage is 40%-60%; and connecting the discarded concrete blocks by ropes;

(6) placing the oyster settlement substrate in site: conveying the oyster settlement substrate in which the gonad of oysters develops into mature stage in the step (3) to the sea area for constructing the break water, placing one lightweight concrete settlement substrate with the rough surface for oyster on single discarded concrete block or discarded concrete block pile and fixing single discarded concrete block or discarded concrete block pile through a rope; in addition, feeding algae or replenishing nutritive salts if necessary according to the planktonic condition of the local sea area; and (7) monitoring and managing the state of larval settlement: monitoring the settlement condition of oyster larvae on the rock surface; when the larval settlement density is 30 to 40 larvae/100 $cm^2$, moving away the oyster settlement substrate, monitoring the ecological condition of a breakwater for a long time, and providing corresponding measures according to the practical condition.

The lightweight concrete settlement substrate with the rough surface as described in the specific measure in the step (2) comprises the following material components in percentage by weight: 21.8-34.5% of a cementitious material, 24.6-37.5% of lightweight coarse aggregate, 15.8-29.6% of lightweight fine aggregate, 8.4-16.4% of water, 0.6-3.0% of a dark pigment, 0.4-2.0% of biological calcium powder, 0.4-2.0% of calcium carbonate powder, 0.2-1.8% of trace elements, 0.15-1.5% of chopped fibers and 0.03-0.18% of a superplasticizer.

DETAILED DESCRIPTION OF EXAMPLES

Figure 1:
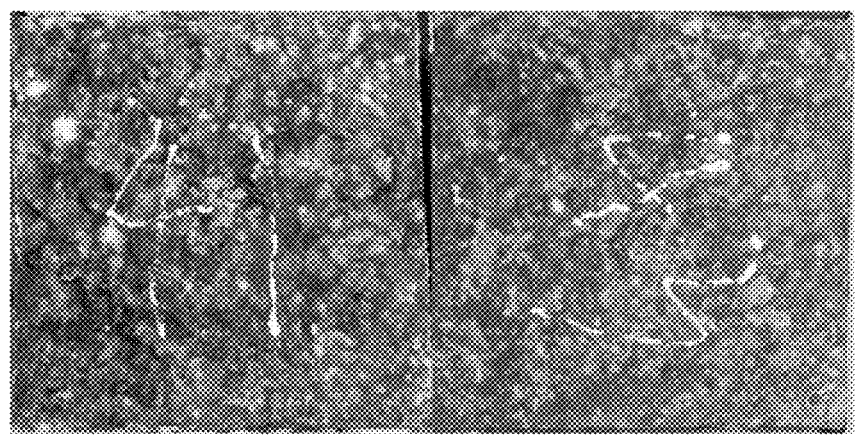
FIG. 1 shows mildewing condition on a surface of different concrete mix with 10% bovine bone powder (under standard curing)

The present disclosure will be described in detail below by means of Examples, which are only used to illustrate the present disclosure and do not limit the scope of the present disclosure. The specific technical solution steps of the project plan are as follows:

Example 1

(1) Surveying of a sea area of a breakwater construction position: the dominant species of oysters in the sea area and whether the oysters are settled are surveyed; the test is performed 15 times in each season, and the air temperature, seawater temperature, dissolved oxygen, plankton, total dissolved inorganic nitrogen, active phosphate, active silicate, $Ca^{2+}$, $Zn^{2+}$, $K^+$ and the like in the sea area are recorded; the typhoon times, strength and the like over the years are surveyed; the meteorological and hydrological data of the sea area for many years are looked up; and a feasible method and a solution for constructing an ecological riprap breakwater are analyzed.

(2) Manufacturing of a concrete settlement substrate: a lightweight concrete settlement substrate with a rough surface for oyster is manufactured using ecological concrete, the size of the settlement substrate is 10 cm×10 cm×2 cm, after demolding, curing with $CO_2$ is carried out under 10 atmospheric pressures for 1 h, and then standard curing is carried out for 28 d.

(3) Regular and quantitative collecting and cultivating of oyster larvae: the settlement substrate with the rough surface is placed in a larva collection area of a nearby sea area in July, the collection of the larvae is stopped when the amount of settled oyster larvae is 20 larvae/100 $cm^2$, and then the settlement substrate is moved to a sea area with rich baits for floating cultivation.

(4) Surface treatment of discarded concrete: the alkalinity, the internal ion concentration and the permeability of the discarded concrete are detected by sampling (5% of the total amount); if the pH is more than 12.5, $CO^2$ curing is carried out on the discarded concrete for 1 h under 10 atmospheric pressures to reduce the alkalinity; then the concrete blocks are wetted; and an emulsified asphalt cement-based coating with high bonding strength and high induction for oyster to settle is sprayed or brushed on the surfaces of the concrete blocks.

(5) Placing of discarded concrete blocks: in June of the next year, a dispersed placement method is adopted to place the discarded concrete blocks with volume of more than 1 $m^3$ individually, and each discarded concrete block is covered with a rope; multiple discarded concrete blocks with the volume of less than 1 m3 are covered with the ropes to form a discarded concrete block pile with a volume of 1-5 m3, wherein the internal voidage is 50%; and the discarded concrete blocks and the discarded concrete block piles are connected by ropes 30, and the distance between every two rocks (piles) is kept at 4 m;

(6) Placing of the oyster settlement substrate in site: the oyster settlement substrate where oysters (the gonad of oysters developed into mature stage) are well settled on the concrete surface is conveyed to the sea area for constructing the breakwater, one oyster settlement substrate is placed on single discarded concrete block or pile and each discarded concrete block (pile) is fixed with ropes; and (7) Monitoring and managing the state of the larva settlement: when the settlement density of the oyster larvae on the rock surface is 35 larvae/100 $cm^2$ by monitoring, the oyster settlement substrate is moved away, and meanwhile, the type and quantity of plankton in the sea area are monitored to decide whether to continue to put in bait.

Example 2

(1) Surveying of a sea area of a breakwater construction position: the dominant species of oysters in the sea area and whether the oysters are settled are surveyed; the test is performed 15 times in each season, and the air temperature, seawater temperature, dissolved oxygen, plankton, total dissolved inorganic nitrogen, active phosphate, active silicate, $Ca^{2+}$, $Zn^{2+}$, $K^+$ and the like in the sea area are recorded; the typhoon times, strength and the like over the years are surveyed; the meteorological and hydrological data of the sea area for many years are looked up; and a feasible method and a solution for constructing an ecological riprap breakwater are analyzed;

(2) Manufacturing of a concrete settlement substrate: a lightweight concrete settlement substrate with a rough surface for oyster is manufactured using ecological concrete, the size of the settlement substrate is 10 cm×10 cm×3 cm, after demolding, curing with $CO_2$ is carried out under 10 atmospheric pressures for 1.5 h, and then standard curing is carried out for 28 d;

(3) Regular and quantitative collecting and cultivating of oyster larvae: the settlement substrate with the rough surface is placed in a larva collection area of a nearby sea area in August, the collection of the larvae is stopped when the amount of settled oyster larvae is 25 larvae/100 $cm^2$, and then the settlement substrate is moved to a sea area with rich baits for floating cultivation.

(4) Surface treatment of discarded concrete: the alkalinity, the internal ion concentration and the permeability of the discarded concrete are detected by sampling (5% of the total amount); if the pH is more than 12.5, $CO_2$ curing is carried out on the discarded concrete for 1 h under 10 atmospheric pressures to reduce the alkalinity; then the concrete blocks are wetted; and an emulsified asphalt cement-based coating with high bonding strength and high induction for oyster to settle is sprayed or brushed on the surfaces of the concrete blocks.

(5) Placing of discarded concrete blocks: in July of the next year, a dispersed placement method is adopted to place the discarded concrete blocks with volume of more than 1 m3 individually, and each discarded concrete block is covered with a rope; multiple discarded concrete blocks with the volume of less than 1 m3 are covered the ropes to form a discarded concrete block pile with a volume of 1-5 $m^3$, wherein the internal voidage is 60%; and the discarded concrete blocks and the discarded concrete block piles are connected by ropes, and the distance between every two discarded concrete blocks (piles) is kept at 5 m;

(6) Placing of the oyster settlement substrate in site: the oyster settlement substrate where oysters (the gonad of oysters developed into mature stage) are well settled on the concrete surface is conveyed to the sea area for constructing the breakwater, one light weight concrete settlement substrate with rough surface for oyster is placed on single discarded concrete block or discarded concrete block pile and single discarded concrete block or discarded concrete block pile is fixed through a rope; and (7) Monitoring and managing the state of the larva settlement: when the settlement density of the oyster larvae on the rock surface is 40 larvae/100 $cm^2$ by monitoring, the oyster settlement substrate is moved away, and meanwhile, the type and quantity of plankton in the sea area are monitored to decide whether to continue to put in bait.

Figure 5:
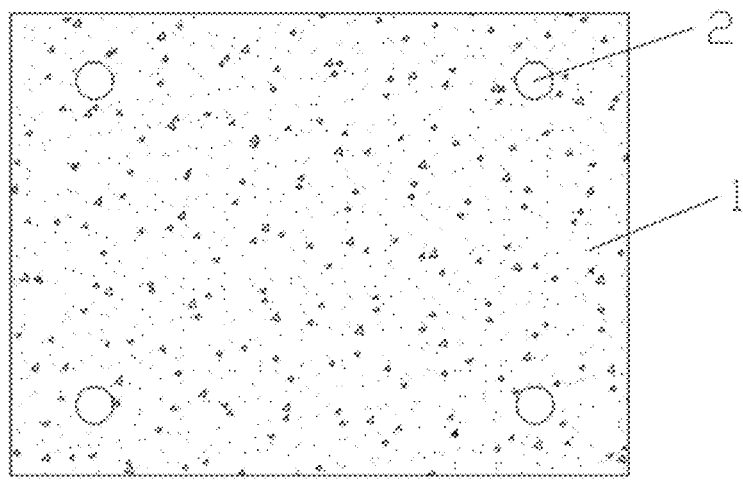
FIG. 5 is a schematic diagram of a concrete oyster settlement substrate.
Figure 6:
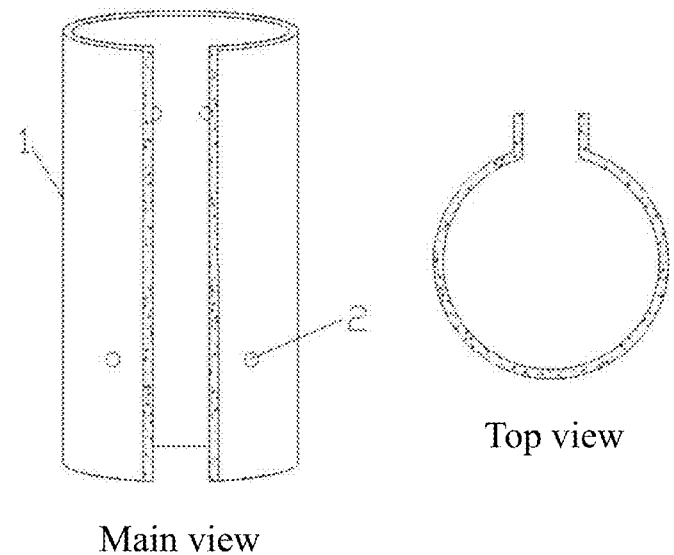
FIG. 6 is a schematic diagram of a concrete oyster settlement substrate.
Figure 7:
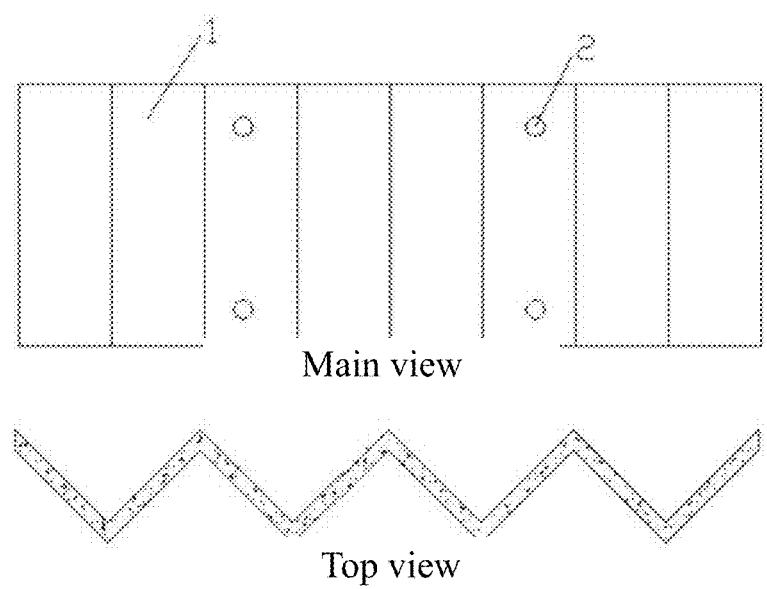
FIG. 7 is a schematic diagram of a concrete oyster settlement substrate.

The settlement substrate for oyster and emulsified asphalt cement-based coating in the Examples 1 and 2 are specifically as follows:

the concrete mix of the lightweight concrete settlement substrate with the rough surface for oyster (1-25), and the mix of emulsified asphalt cement-based coating for inducing the settlement of sessile organisms for marine engineering surface (26-35) are specifically shown in FIGS. 5-7.

Example 1: According to the concrete mix of ordinary Portland cement, the mix ratio by weight of ordinary Portland cement, lightweight coarse aggregate, lightweight fine aggregate, water and polycarboxylate superplasticizer powder are 29.37%, 33.53%, 24.48%, 12.59% and 0.03% in a sequence.

Wherein the lightweight coarse aggregate is one or two of crushed lightweight porous basalt and lightweight ceramsite of which the maximum particle size is less than 20 mm. The lightweight fine aggregate is one or two of crushed zeolite and lightweight ceramic sand, has the particle size of 0.2 to 5 mm and is well graded. The water should meet the concrete water standard (JGJ63-2006), the Cl— content is less than 1,000 mg/L, the pH value is more than 4.5, and the influence on the initial setting time, final setting time, strength and permeability of cement is small. In the Examples 1 to 25, the above materials are the same.

Example 2: According to the reference concrete mix, the mix ratio by weight of ordinary Portland cement, silica fume, blast furnace slag powder, lightweight coarse aggregate, lightweight fine aggregate, water and polycarboxylate superplasticizer powder are 17.62%, 1.47%, 10.28%, 33.53%, 24.48%, 12.59% and 0.03% in a sequence.

Example 3: The mix ratio by weight of an unmodified dark pigment, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 4: The mix ratio by weight of an unmodified dark pigment, ordinary Portland cement, silica fume, blast furnace slag powder, lightweight coarse aggregate, lightweight fine aggregate, water and polycarboxylate superplasticizer powder are 1.47%, 17.62%, 1.28%, 8.99%, 33.53%, 24.48%, 12.59% and 0.03% in a sequence.

Example 5: The mix ratio by weight of an unmodified dark pigment, ordinary Portland cement, silica fume, blast furnace slag powder, lightweight coarse aggregate, lightweight fine aggregate, water and polycarboxylate superplasticizer powder are 2.35%, 17.62%, 1.18%, 8.23%, 33.53%, 24.48%, 12.59% and 0.03% in a sequence.

Example 6: The mix ratio by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 7: The mix ratio by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 1.47%, 17.62%, 1.28%, 8.99%, 33.53%, 24.48%, 12.59% and 0.03% in a sequence.

Example 8: The mix ratio by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 2.35%, 17.62%, 1.18%, 8.23%, 33.53%, 24.48%, 12.59% and 0.03% in a sequence.

Wherein the modified dark pigment is prepared by the following steps: mixing 196 transparent resin, 3% of a hardener and 1.5% of an accelerator, wherein the volume ratio of the pigment to the resin is 1:0.2; curing at a normal temperature for 4 h, curing at 60° C. for 4 h, breaking, and grinding with a vibration mill until the fineness is greater than 400 meshes.

Example 9: The mix ratio by weight of calcium carbonate powder, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 10: The mix ratio by weight of calcium carbonate powder, ordinary Portland cement, silica fume, blast furnace slag powder, lightweight coarse aggregate, lightweight fine aggregate, water and polycarboxylate superplasticizer powder are 1.47%, 17.62%, 1.28%, 8.99%, 33.53%, 24.48%, 12.59% and 0.03% in a sequence.

Example 11: The mix ratio by weight of calcium carbonate powder, ordinary Portland cement, silica fume, blast furnace slag powder, lightweight coarse aggregate, lightweight fine aggregate, water and polycarboxylate superplasticizer powder are 2.35%, 17.62%, 1.18%, 8.23%, 33.53%, 24.48%, 12.59% and 0.03% in a sequence.

Example 12: The mix ratio by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 0.87%, 17.62%, 1.18%, 8.23%, 33.53%, 24.48%, 12.59% and 0.03% in a sequence.

Example 13: The mix ratio by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 1.47%, 17.62%, 1.10%, 7.71%, 33.53%, 24.48%, 12.59% and 0.03% in a sequence.

Example 14: The mix ratio by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 2.35%, 17.62%, 0.99%, 6.94%, 33.53%, 24.48%, 12.59% and 0.03% in a sequence.

Example 15: The mix ratio by weight of unmodified bovine bone powder, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 16: The mix ratio by weight of unmodified bovine bone powder, ordinary Portland cement, silica fume, blast furnace slag powder, lightweight coarse aggregate, lightweight fine aggregate, water and polycarboxylate superplasticizer powder are 1.47%, 17.62%, 1.28%, 8.99%, 33.53%, 24.48%, 12.59% and 0.03% in a sequence.

Example 17: The mix ratio by weight of unmodified bovine bone powder, ordinary Portland cement, silica fume, blast furnace slag powder, lightweight coarse aggregate, lightweight fine aggregate, water and polycarboxylate superplasticizer powder are 2.35%, 17.62%, 1.18%, 8.23%, 33.53%, 24.48%, 12.59% and 0.03% in a sequence.

Example 18: The mix ratio by weight of modified bovine bone powder, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 19: The mix ratio by weight of modified bovine bone powder, ordinary Portland cement, silica fume, blast furnace slag powder, lightweight coarse aggregate, lightweight fine aggregate, water and polycarboxylate superplasticizer powder are 1.47%, 17.62%, 1.28%, 8.99%, 33.53%, 24.48%, 12.59% and 0.03% in a sequence.

Example 20: The mix ratio by weight of modified bovine bone powder, ordinary Portland cement, silica fume, blast furnace slag powder, lightweight coarse aggregate, lightweight fine aggregate, water and polycarboxylate superplasticizer powder are 2.35%, 17.62%, 1.18%, 8.23%, 33.53%, 24.48%, 12.59% and 0.03% in a sequence.

A bovine bone powder modification method comprises the following steps: adding 100-mesh bovine bone powder into a phosphoric acid solution with the concentration of 2%, wherein the weight ratio of the bovine bone powder to the phosphoric acid solution is 1:3, and the temperature is 20-30° C.; stirring in a stirrer at a rotating speed of 200-500 r/min for 30 min, centrifuging for 3 min by adopting a centrifugal machine at a rotating speed of 3,000-5,000 r/min, pouring out the supernatant, and washing the centrifuged solid substance for 2-3 times by water until washing water did not show acidity anymore; and performing vacuum drying on the centrifuged solid substance at the temperature of 40° C., grinding the dried bovine bone powder and slag powder in a mass ratio of 1:4 by a vibration mill until the fineness is more than 200 meshes, and standing for later use.

Example 21: The mix ratio by weight of calcium carbonate powder, zinc sulfate, a modified dark pigment (the mass ratio of iron oxide black to an aniline black mixture is 1:1), ordinary Portland cement, blast furnace slag powder, silica fume, lightweight coarse aggregate, lightweight fine aggregate, water and polycarboxylate superplasticizer powder are 2.35%, 0.5%, 1.47%, 17.62%, 0.93%, 6.50%, 33.53%, 24.48%, 12.59% and 0.03% in a sequence.

Example 22: The mix ratio by weight of calcium carbonate powder, zinc sulfate, a modified dark pigment (the mass ratio of iron oxide black to an aniline black mixture is 1:1), ordinary Portland cement, blast furnace slag powder, silica fume, lightweight coarse aggregate, lightweight fine aggregate, water and polycarboxylate superplasticizer powder are 2.35%, 1.2%, 1.47%, 17.62%, 0.84%, 5.89%, 33.53%, 24.48%, 12.59% and 0.03% in a sequence.

Example 23: The mix ratio by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water and polycarboxylate superplasticizer powder are 0.5%, 1.47%, 1.47%, 0.87%, 17.62%, 0.93%, 6.50%, 33.53%, 24.48%, 12.59% and 0.03% in a sequence.

Example 24: The mix ratio by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water and polycarboxylate superplasticizer powder are 0.6%, 1.47%, 1.47%, 0.87%, 17.62%, 0.84%, 5.89%, 33.53%, 24.48%, 12.59% and 0.03% in a sequence.

A modification method of zinc sulfate comprises the following steps: selecting diatomite with $SiO_2$ content of more than 90% and fineness of 600 meshes, adding 150 g of water into a stirrer at 60° C., then adding 100 g of zinc sulfate, stirring until the zinc sulfate is completely dissolved, and standing for later use; and then heating 150 g of diatomite to 60° C., adding the diatomite into the solution, stirring for 10 min in a stirrer at a rotating speed of 200-500 r/min, and then drying in a drying oven with a temperature of 100° C., thus obtaining the modified zinc sulfate.

Example 25: The mix ratio by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water, chopped fibers and polycarboxylate superplasticizer powder are 0.5%, 1.47%, 1.47%, 0.87%, 17.62%, 0.94%, 6.50%, 33.07%, 24.14%, 12.59%, 0.8% and 0.03% in a sequence.

Example 26: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.05:0.05:0.04:0.12:0.005.

Example 27: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.08:0.08:0.06:0.12:0.005.

Example 28: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.08:0.08:0.02:0.12:0.005.

Example 29: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.03:0.03:0.06:0.12:0.005.

Example 30: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.03:0.03:0.04:0.12:0.005.

Example 31: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.05:0.05:0.02:0.12:0.005.

Example 32: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.08:0.08:0.04:0.12:0.005.

Example 33: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.08:0.08:0.06:0.12:0.005.

Example 34: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.03:0.05:0.02:0.12:0.005.

Example 35: The mix ratio by weight of the emulsified asphalt, a cementitious material, sand, water, modified biological calcium powder (the mass ratio of modified bovine bone powder to oyster shell powder is 2:1), calcium carbonate powder, zinc sulfate, acrylic emulsion, and the superplasticizer is 0.6:1:1:0.20:0.03:0.03:0.02:0.12:0.005.

A bovine bone powder modification method comprises the following steps: adding 100-mesh bovine bone powder into a phosphoric acid solution with the concentration of 2%, wherein the weight ratio of the bovine bone powder to the phosphoric acid solution is 1:3, and the temperature is 20-30° C.; stirring in a stirrer at a rotating speed of 200-500 r/min for 30 min, centrifuging for 3 min by adopting a centrifugal machine at a rotating speed of 3,000-5,000 r/min, pouring out the supernatant, and washing the centrifuged solid substance for 2-3 times by water until washing water did not show acidity anymore; and performing vacuum drying on the centrifuged solid substance at the temperature of 40° C., grinding the dried bovine bone powder and slag powder in a mass ratio of 1:4 by a vibration mill until the fineness is more than 200 meshes, and standing for later use.

A modification method of zinc sulfate comprises the following steps: selecting diatomite with $SiO_2$ content of more than 90% and fineness of 600 meshes, adding 150 g of water into a stirrer at 60° C., then adding 100 g of zinc sulfate, stirring until the zinc sulfate is completely dissolved, and standing for later use; and then heating 150 g of diatomite to 60° C., adding the diatomite into the solution, stirring for 10 min in a stirrer at a rotating speed of 200-500 r/min, and then drying in a drying oven with a temperature of 100° C., thus obtaining the modified zinc sulfate.

In Living Breakwaters Coastal Infrastructure in New York_Sun Yihe (hereinafter "comparison document 1"), the "living" breakwaters are constructed, concrete members are manufactured by macroscopic design and surface texture through low-alkali cement, the marine biomass is increased, including marine plants and marine sessile organisms, mostly marine plants. In the present disclosure, besides low alkalization of the concrete, asphalt, biological calcium powder, calcium carbonate powder and trace elements are added into concrete to induce oyster larvae, and the induction is quickly performed in a compact manner, the effect is good, and the ecological environment of the sea area is improved to a great extent.

Compared with CN104938384A (hereinafter "comparison document 2"), the difference is that:

(1) The objective of the present disclosure is different from that of the comparison document 2 in that: in the comparison document 2, although a layer of cement mortar mixed with ground oyster shells is applied to the concrete surface, the objective of the comparison document 2 is mainly achieved through the surface bionic property, including fish, microorganisms and algae, the number of the microorganisms is increased, and thus the water environment is improved; and oysters are not mentioned. The objective of the present disclosure of emulsified asphalt cement-based coating is to induce the settlement of the oyster larvae.

(2) The comparison document 2 indicates that the cement replaced by the biological calcium carbonate powder (150-200 meshes) below 10% for cement mortar as no obvious effect on settlement induction. However, the modified bovine bone powder and biological calcium carbonate powder (with the fineness being 100-1,000 meshes) are adopted in the research process of the present disclosure, and the optimal dosage of the bovine bone powder and the biological calcium carbonate powder account for less than 10% of the cementitious material.

(3) The bovine bone powder and the biological calcium carbonate powder are modified and are specifically modified by treating the 100-500-mesh egg shell powder, coral powder, oyster shell powder and fishbone powder with one or two of acetic acid, acetic acid aqueous solution, silicic acid and sulfurous acid, and treating the 100-500-mesh bovine bone powder with one or two of diluted phosphoric acid, sulfuric acid, hydrochloric acid and nitric acid.

(4) Comparison document has difficulty in inlaying oyster shells on the concrete surface, the method is not adopted on each engineering surface, and the feasibility is low. The present disclosure can achieve a good effect of inducing sessile organisms by painting a layer of emulsified asphalt cement-based coating on the concrete surface, oyster shells are not inlaid, the construction is simple, and the settlement amount of the oyster can be greatly increased. And (5) The phenomenon of serious artificial fish reef corrosion occurs in the marine environment for many times in recent years, and serious corrosion is mainly caused by the combined action of biological sulfuric acid secreted by anaerobic microorganism thiobacillus and acidic substances secreted by other bacteria. The acid corrosion resistance of calcium carbonate is very weak, so that serious acid corrosion can be caused by too high content of calcium carbonate with relatively high fineness.

Compared with a comparison document 3 (Fan Ruiliang. Effect of the Substrate Types on Oyster Settlement, Growth, Population Establishment and Reef Development [D]), the difference is that:

(1) In the comparison document 3, 80-mesh bovine bone powder, calcium powder and gypsum powder are used and independently added into the concrete. The fineness of all calcium materials in the present disclosure is larger than 100 meshes and is larger than that of the materials in the comparison document 3. The bovine bone powder is also added and modified, and the coating and the concrete grain gradation and the induction capacity are considered.

Figure 2:
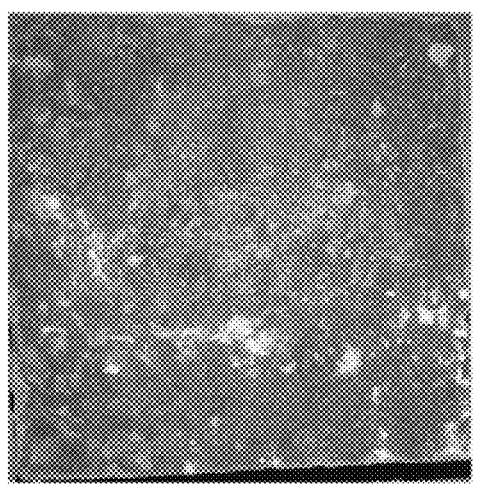
FIG. 2 shows different concrete mix adding 10% modified bovine bone powder with fineness larger than 200 meshes.

(2) The bovine bone powder is ground by a vibration mill under normal temperature conditions, when the fineness is greater than 80 meshes, the bovine bone powder contains lots of collagen and is severely agglomerated and cannot be continuously ground. The diluted acid modification technology is adopted in the present disclosure, and the bovine bone powder is compounded with other substances and ground, so that the bovine bone powder with small particle size and modified biological calcium powder with the fineness of more than 200 meshes are obtained. The prepared biological calcium powder remains the original substances of biological calcium, greatly increases the release rate of the substances inducing oyster larvae to settle, and reduces the dosage of the biological calcium powder, thereby reducing the effect on the coating and the concrete performance. And (3) Due to the fact that bovine bone powder contained rich organic substances such as collagen, the strength and the penetration resistance of coating and concrete can be reduced when a large amount of the substances are added, especially after the dosage exceeds 5%, the strength of the coating and the concrete is rapidly reduced, the penetration resistance is remarkably reduced, and mildew can grow on the surface of the coating and the concrete under the standard curing condition. FIG. 1 shows the mildewing condition of the concrete specimens. FIG. 2 shows the surface condition of the modified concrete.

As shown in FIG. 1, mildew on the surface of concrete is white flocculent and almost covers the whole surface of the concrete; under the same bovine bone powder dosage, age and curing conditions, the surface of the concrete in FIG. 2 is not mildewed.

In the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of coating and concrete are hardly influenced, meanwhile, the composite inducer has very strong oyster larva settlement capability, and the problem of mildewing of the coating and the concrete is solved. Compared with coating and concrete without the inducer, the coating and the concrete with the inducer enables the number of settled oyster larvae to be obviously increased.

The comparison documents and consulted literature data show that the calcium content is very important for the settlement of the oyster larvae, and some experimental results at present also prove that the settlement and the growth of the oyster larvae can be promoted by adding a proper dosage of calcium carbonate substances into a cement-based material. However, cement coating and cement concrete contain a large number of calcium ions, the pH value in a pore solution is generally greater than 12.5, and the pH value of a saturated calcium hydroxide solution is about 12 at normal temperature, thus the concentration of the calcium ions in the pore solution of the concrete is about 5 mmol/L; and the solubility of calcium carbonate is very small and is only $9.5\times10^{-5}$ mol/L ($9.5\times10^{-2}$ mmol/L) at $25°$ C. At present, the optimal range of the concentration of the calcium ions for inducing the settlement of the oysters is 10-25 mmol/L, and even if the oyster larvae are placed in the saturated calcium carbonate solution, the concentration of $Ca^{2+}$ is not enough to provide the appropriate ion concentration for the settlement of the oysters. Further, $Ca(OH)_2$ in the cement coating and the cement concrete can be released more quickly, and the dissolution of the calcium carbonate need a longer time. Therefore, it can be inferred that the calcium carbonate material added into the coating and the concrete can promote the settlement of the oyster larvae, and the $Ca^{2+}$ does not play a leading role. The early settlement and metamorphosis of the oysters are related to $HCO_3-$, and the secondary shells of the calcium carbonate are generated by $HCO_3-$ together with the $Ca^{2+}$ during metamorphosis. After the calcium carbonate is added, the calcium carbonate reacts with $CO_2$ and water to generate $Ca(HCO_3)_2$ to participate in the settlement, which is a fundamental mechanism for promoting the settlement of the oyster larvae.

There is an optimum dosage in the dosage of calcium carbonate in the cement-based material, which can be explained from the following three aspects:

1) For equivalent substituted cement, the alkali in the coating and the concrete is diluted along with the increase of the dosage of the calcium carbonate, and the total alkalinity is reduced; however, along with the increase of the dosage of the calcium carbonate, the dissolution probability of the calcium carbonate in the coating and the concrete is increased, and the content of $HCO_3-$ in the solution is increased, thus the settlement and the metamorphosis of the oysters are promoted; however, when the dosage is too large, the permeability of the coating and the concrete is increased sharply, and the alkali and carbonate radicals in the coating and the concrete are quickly leached, so that the negative effect of the alkali is prominent, and the critical or negative effect of the carbonate radicals is initially prominent, thus the settlement amount is reduced;

2) For equivalent substituted aggregate, the permeability of the coating and the concrete is reduced along with the increase of the dosage, consequently, the leach of calcium ions and $OH-$ is reduced, but the leach rate of carbonate ions is gradually increased first, and when the leach rate reaches a certain value, oyster settlement reaches a maximum value; and along with the continuous increase of the dosage, the reduction amplitude of the calcium ions is large, and the carbonate radicals are possibly reduced, thus the settlement of the oyster larvae is limited by the concentration of the calcium ions, and the settlement is reduced; and 3) For an equivalent substituted mineral admixture, the permeability is increased along with the increase of the dosage, and the $HCO_3-$ concentration reaches a proper range for the oyster settlement due to the increase of calcium carbonate, which indicates the increase of the settled oyster larvae; and along with the continuous increase of the dosage of the calcium carbonate, the dosage of the mineral admixture is reduced, so the amount of leaching alkali is increased, the carbonate radicals are increased, and the settlement of the oyster larvae is inhibited by excessive alkali and $HCO_3-$ ions.

Compared with a comparison document 4 (Li Zhenzhen, Gong Pihai, Guan Changtao, et al, Study on the Organisms Attachment of Artificial Reefs Constructed with Five Different Cements [J]. Progress in Fishery Sciences, 2017, 38(5):57-63], the difference is that:

In the comparison document 4, composite Portland cement, slag Portland cement, pozzolanic Portland cement, fly ash Portland cement and aluminate cement are used. In the present disclosure, low-alkalinity cement is achieved by ordinary Portland cement adding mineral admixtures; silica fume is one of the mineral admixtures and has high activity, and optimum dosage of silica fume can achieve obvious effect on increasing the durability of reinforced concrete in the marine environment. Low-alkalinity cement with the excellent strength and durability can be obtained through optimization design and experiments. Meanwhile, by means of the high penetration resistance characteristic of the silica fume concrete, even if the alkalinity in the concrete is high, a large number of oyster larvae still settle to, metamorphosize and grow on the concrete surface. The low-alkalinity sulphoaluminate cement is compounded to regulate and control the alkalinity of the cement concrete, and thus an appropriate pH value is provided for oyster larva settlement. In addition, compared to marine plants, oysters, barnacles and other sessile organisms are different in alkali resistance, the environments needed in the settlement period and later period are different, for example, a large number of calcium ions are needed for settlement, metamorphosis and later-period growth of the barnacles and the oysters.

Figure 3:
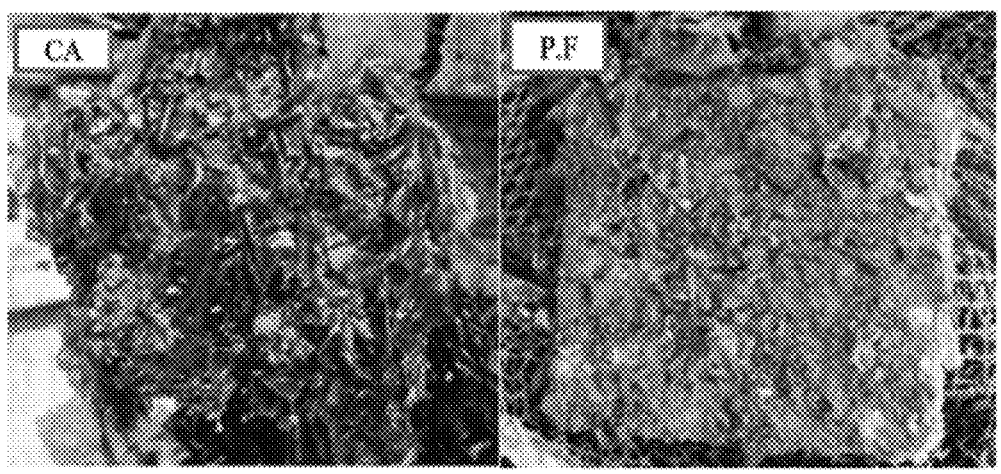
FIG. 3 is a picture of 210 d of a settlement experiment in sea.
Figure 4:
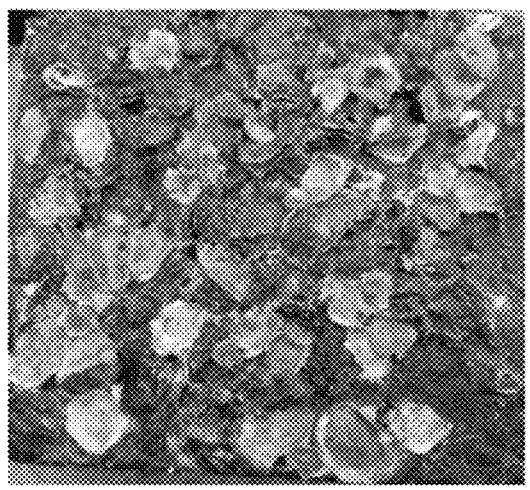
FIG. 4 is a picture of 300 d of a settlement experiment in seat.

In the comparison document 4, the concrete is used for enriching marine organisms, focusing on the amount and diversity of attached biomass, and the mainly attached organisms are various algae and the like. The research objective of the present disclosure is to induce the settlement of the oysters, but the alkalinity tolerance of oysters and barnacles is higher than that of algae, and a large amount of calcium ions are needed for settlement and metamorphosis of the oysters, so that the two kinds of concrete look like the same, but in fact there is a big difference. FIG. 3 and FIG. 4 respectively show the oyster settlement comparison conditions between the comparison document 4 after performing the real sea settlement experiment for about 210 d and the present disclosure after performing the real sea settlement experiment for 300 d.

Therefore, the above knowledge relates to crossing of the marine sessile organism discipline, marine plants and marine concrete engineering disciplines, and technicians in the fields of concrete and engineering or the field of marine organisms cannot obtain the technical characteristics of close correlation between the balance between the reduction of the alkalinity of the concrete and the concentration of calcium ions and the settlement of the marine sessile organisms from the comparison document 4.

In addition, the present disclosure has the unique characteristics and the following beneficial effects:

Dark Pigment and Emulsified Asphalt

The light-shielding characteristic of oyster eyespot larvae is utilized, the dark pigment (one or two of iron oxide black, nigrosine, carbon black, antimony sulfide, iron oxide red and organic pigment red) or emulsified asphalt are doped into the coating and the concrete, the color of the coating and the concrete are changed and darkened, the coating and the concrete are regarded as a dark environment by the oyster larvae, thus the oyster larvae are induced to reach the dark coating surface and concrete surface, the contact probability of the larvae and the coating surface and the concrete surface are increased, and the induced settlement rate of the oyster larvae is increased. Specifically:

Marine organism researchers carry out the research on the settlement of marine sessile organisms by substrates with different colors in order to realize cultivation and propagation or eliminate unexpected populations, which belongs to the marine organism discipline. The marine organism discipline is quite different from the marine concrete engineering or cement-based material discipline, they are completely two major disciplines. Through the crossing of the marine sessile organism discipline and the cement-based material discipline, the induced settlement of the oyster larvae by dark coating and dark concrete is realized. In the present disclosure, the dark pigment or emulsified asphalt is added to deepen the surface color of coating and concrete so as to promote the settlement of the oyster larvae. Other materials are added in the coating and the concrete, which can affect the properties of the coating and the concrete. In the present disclosure, in consideration of the concrete of different cements, there is a difference in surface color of the coating and the concrete. Therefore, the dosage of the dark substances can be determined according to the type and dosage of the cement. The dark pigment or emulsified asphalt also affects the properties of the coating and the concrete. Most importantly, when the dark pigment or emulsified asphalt is added, if the penetration rates of alkali, $Ca^{2+}$ and the like in the coating and the concrete are not controlled, the leached alkali can affect the settlement, metamorphosis and growth of the sessile organism larvae, and when the dosage is greater than a certain value, the settlement amount of the larvae is reduced. In the present disclosure, the penetration resistance of the coating and the concrete is designed and controlled, and the main measures are as follows: selection of the type of the dark pigment or emulsified asphalt, control of the dosage and modification. With the increase of the dosage of the dark pigment, the settlement rate of the larvae is increased first, and when the dosage accounted of 0.5%-6% of the cementitious material, the settlement amount of the larvae is maximum, but is slightly increased or kept unchanged later.

Trace Elements

A large amount of zinc is enriched in the oyster body, and zinc concentration is far higher than that in the seawater in which the oyster lives, and meanwhile, the oyster body further contains more Fe, P and K elements. Meanwhile, proper concentration of $Zn^{2+}$ and $K^+$ in the solution can promote early settlement and metamorphosis of the oyster larvae. Therefore, zinc sulfate, potassium sulfate, potassium nitrate, ferric sulfate, zinc phosphate, ammonium nitrate, potassium phosphate, ammonium phosphate, ferric phosphate and calcium phosphate are adopted as the trace elements to be doped into the coating and the concrete, and these substances are modified to enable the strength and the penetration resistance of the coating and the concrete to be basically kept unchanged, and thus the induced settlement rate of the oyster larvae is greatly increased. Specifically:

Marine organism researchers carry out the research on the settlement and metamorphosis of different ions to marine sessile organisms in order to clarify oyster settlement mechanisms and cultivation propagation, which belongs to the marine organism discipline. The marine organism discipline is quite different from the marine concrete engineering or cement-based material discipline, they are completely two major disciplines. Through the crossing of the marine sessile organism discipline and the cement-based material discipline, corresponding substances are added into the concrete to induce the oyster larvae to settle on the surface of the coating and the concrete. Soluble salts have great influence on the properties of the coating and the concrete, such as influence on early workability, setting time and later strength and penetration resistance. Diatomite is adopted as a carrier in the present disclosure, the inorganic salts are fixed in the diatomite, and thus the influence of the soluble salts on the properties of the coating and the concrete is reduced. Meanwhile, the effect of improving the properties of the coating and the concrete by the diatomite is utilized to keep good mechanical property and penetration resistance of the coating and the concrete when these inducing substances are added. In addition, diatomite serving as the carrier has a slow release effect, thus soluble salt is released slowly, and particularly, the release is kept at a very low rate after the diatomite is soaked in seawater for a certain period of time. Therefore, the above knowledge relates to crossing of the marine sessile organism discipline, chemistry and marine concrete engineering disciplines, and technicians in the fields of concrete and engineering or the field of marine organisms cannot obtain the technical characteristics of close correlation between the technology of doping the trace elements into the coating and the concrete to change the ion content of the trace elements on the surface of the coating and the concrete and control the permeability of the cement-based material and the cement-based material with the capability of efficiently inducing the settlement of the oysters through the existing background.

Coating and Concrete Permeability

The strength and permeability of concrete are two main properties of the coating and the concrete. Different inducers added into reference coating and reference concrete can influence the properties of the coating and the concrete. Therefore, when different substances are added to promote settlement, metamorphosis and later growth of the oyster larvae, it must be integrally controlled to make sure that the different substances do not have a big impact on the strength and permeability of the coating and the concrete, and then raw materials are selected according to the compatibility of various raw materials. If the properties of the raw materials cannot meet the actual requirements, the raw materials are modified and then added so as to achieve the expected functions. In practice, although related research is performed by considering the influence of the dosage of calcium on oyster larva settlement, the properties of coating and concrete, the water-cement ratio, the dosage of calcium, maintenance and the like are not considered, moreover, the leakage rate of alkali and ions in the coating and the concrete can be changed due to the change of the permeability of the coating and the concrete, the poorer the penetration resistance of the coating and the concrete is, the higher the leakage rate of the alkali and the ions in the coating and the concrete is, and the leakage rate may be exponentially increased. Therefore, the leached alkali and ions can greatly influence the larvae, a change from promoting settlement to inhibiting settlement may occur, and particularly when the content of cement is large, the situation is more serious. Therefore, when the inducer is added into the coating and the concrete, it must be guaranteed that the change of the penetration resistance of the coating and the concrete is within a controllable range, for example, the change cannot exceed 10%. In this way, the induction effects can be compared, otherwise, the influence of single inducer addition or inducer composite addition on the induction effect of the oyster larvae cannot be evaluated.

Therefore, the above knowledge relates to crossing of the marine sessile organism discipline, marine plants and marine concrete engineering disciplines, and technicians in the fields of concrete and engineering or the field of marine organisms cannot obtain the technical characteristics of close correlation between the technology of mixing the dark pigment or emulsified asphalt into the concrete to change the color, the technology of modifying the bovine bone powder, the technology of grinding and the technology of controlling the permeability of the cement-based material and the cement-based material with the capability of efficiently inducing the settlement of the oysters and high durability concrete from the comparison documents 2-3. The technicians also cannot obtain the technical characteristics of close correlation between the balance between the reduction of the alkalinity of the cement-based material and the concentration of calcium ions and the settlement of the marine sessile organisms from the comparison document 4.

Only the optimum environment required by settlement, metamorphosis and later growth of marine sessile organisms is mastered, and coating and concrete can be designed from the penetration resistance level of the coating and the concrete instead of only considering the dosage of various raw materials and ignoring the penetration resistance change of the coating and the concrete. Therefore, the above knowledge relates to crossing of the marine sessile organism discipline, chemistry and marine concrete engineering disciplines, and technicians in the fields of concrete and engineering or the field of marine organisms cannot obtain the technical characteristics of close correlation between the integral control technology of the penetration resistance of the coating and the concrete and the technology of promoting the capability of inducing the settlement of the oysters by the inducer through the existing background.

The example is the same as the emulsified asphalt cement-based coating for inducing sessile organisms on the surface of marine engineering (26-36) and will not be repeated here. The present disclosure will be described in detail below by means of Examples, which are only used to illustrate the present disclosure and do not limit the scope of the present disclosure.

Compared with a comparison document 2 (a bionic concrete artificial fish reef and a preparation method thereof 2015 CN104938384 A), the difference is that:

(1) The objective of the present disclosure is different from that of the comparison document 2 in that: in the comparison document 2, although a layer of cement mortar mixed with ground oyster shells is applied to the concrete surface, the objective of the comparison document 2 is mainly achieved through the surface bionic property, including fish, microorganisms and algae, the number of the microorganisms is increased, and thus the water environment is improved; and oysters are not mentioned. The objective of the present disclosure of emulsified asphalt cement-based coating is to induce the settlement of the oyster larvae, mainly oysters; the settlement of barnacles can be considered when performing corrosion prevention on reinforced concrete in the tidal zone.

(2) The comparison document 2 indicates that the cement replaced by the biological calcium carbonate powder (150-200 meshes) below 10% for cement mortar has no obvious effect on settlement induction. However, the modified bovine bone powder and biological calcium carbonate powder are mixed with the emulsified asphalt cement-based coating (with the fineness being 100-1,000 meshes) in the research process of the present disclosure, and the optimal dosage of the bovine bone powder and the biological calcium carbonate powder accounts for less than 10% of the cementitious material.

(3) The bovine bone powder and the biological calcium carbonate powder are modified and are specifically modified by treating the 100-500-mesh egg shell powder, coral powder, oyster shell powder and fishbone powder with one or two of acetic acid, acetic acid aqueous solution, silicic acid and sulfurous acid, and treating the 100-500-mesh bovine bone powder with one or two of diluted phosphoric acid, sulfuric acid, hydrochloric acid and nitric acid.

(4) Comparison document has difficulty in inlaying oyster shells on the concrete surface, the method is not adopted on each engineering surface, and the feasibility is low. The present disclosure can achieve a good effect of inducing sessile organisms by painting a layer of emulsified asphalt cement-based coating on the concrete surface, and oyster shells are not inlaid; the construction is simple, and the settlement amount of the oyster can be greatly increased. And, (5) The phenomenon of serious artificial fish reef corrosion occurs in the marine environment for many times in recent years, and serious corrosion is mainly caused by the combined action of biological sulfuric acid secreted by anaerobic microorganism thiobacillus and acidic substances secreted by other bacteria. The acid corrosion resistance of calcium carbonate is very weak, so that serious acid corrosion can be caused by too high content of calcium carbonate with relatively high fineness.

Compared with a "Effect of the Substrate Types on Oyster Settlement, Growth, Population Establishment and Reef Development" by Fan Ruiliang, (hereinafter comparison document 3), the difference is that:

(1) In the comparison document 3, 80-mesh bovine bone powder, calcium powder and gypsum powder are used and independently added into the concrete. The fineness of all calcium materials in the present disclosure is larger than 100 meshes and is larger than that of the materials in the comparison document 3. The bovine bone powder is also added and modified, and the coating grain gradation and the induction capacity are considered.

(2) The bovine bone powder is ground by a vibration mill under normal temperature conditions, when the fineness is greater than 80 meshes, the bovine bone powder contains lots of collagen and is severely agglomerated and cannot be continuously ground. The diluted acid modification technology is adopted in the present disclosure, and the bovine bone powder is compounded with other substances and ground, so that the bovine bone powder with small particle size and modified biological calcium powder with the fineness of more than 200 meshes are obtained. The prepared biological calcium powder remains the original substances of biological calcium, greatly increases the release rate of the substances inducing oyster larvae to settle, and reduces the dosage of the biological calcium powder, thereby reducing the effect on the coating performance.

(3) Due to the fact that bovine bone powder contains rich organic substances such as collagen, the strength and the penetration resistance of coating can be reduced when a large amount of the substances is added, especially after the dosage exceeds 5%, the strength of the coating is rapidly reduced, the penetration resistance is remarkably reduced, and mildew can grow on the surface of the coating under the standard curing condition.

In the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of coating are hardly influenced, meanwhile, the composite inducer has very strong oyster larva settlement capability, and the problem of mildewing of the coating is solved. Compared with coating without the inducer, the coating with the inducer enables the number of settled oyster larvae to be obviously increased.

The comparison documents and consulted literature data show that the calcium content is very important for the settlement of the oyster larvae, and some experimental results at present also prove that the settlement and the growth of the oyster larvae can be promoted by adding a proper dosage of calcium carbonate substances into a cement-based material. However, cement-based coating contains a large number of calcium ions, the pH value in a pore solution is generally greater than 12.5, and the pH value of a saturated calcium hydroxide solution is about 12 at normal temperature, thus the concentration of the calcium ions in the pore solution of the cement-based coating is about 5 mmol/L; and the solubility of calcium carbonate is very small and is only 9.5×10−5 mol/L (9.5×10−2 mmol/L) at 25° C. At present, the optimal range of the concentration of the calcium ions for inducing the settlement of the oysters is 10-25 mmol/L, and even if the oyster larvae are placed in the saturated calcium carbonate solution, the concentration of $Ca^{2+}$ is not enough to provide the appropriate ion concentration for the settlement of the oysters. Further, $Ca(OH)_2$ in the coating can be released more quickly, and the dissolution of the calcium carbonate needs a longer time. Therefore, it can be inferred that the calcium carbonate material added into the coating can promote the settlement of the oyster larvae, and the $Ca^{2+}$ does not play a leading role. The early settlement and metamorphosis of the oysters are related to $HCO_3^-$, and the secondary shells of the calcium carbonate are generated by $HCO_3^-$ together with the $Ca^{2+}$ during metamorphosis. After the calcium carbonate is added, the calcium carbonate reacts with $CO_2$ and water to generate $Ca(HCO_3)_2$ to participate in the settlement, which is a fundamental mechanism for promoting the settlement of the oyster larvae.

There is an optimum dosage in the dosage of calcium carbonate in the cement-based material, which can be explained from the following three aspects:

1) For equivalent substituted cement, the alkali in the cement-based material is diluted along with the increase of the dosage of the calcium carbonate, and the total alkalinity is reduced; however, along with the increase of the dosage of the calcium carbonate, the dissolution probability of the calcium carbonate in the cement-based material is increased, and the content of $HCO_3^-$ in the solution is increased, thus the settlement and the metamorphosis of the oysters are promoted; however, when the dosage is too large, the permeability of the cement-based material is increased sharply, and the alkali and carbonate radicals in the cement-based material are quickly leached, so that the negative effect of the alkali is prominent, and the critical or negative effect of the carbonate radicals is initially prominent, thus the settlement amount is reduced;

2) For equivalent substituted aggregate, the permeability of the cement-based material is reduced along with the increase of the dosage, consequently, the leach of calcium ions and $OH^-$ is reduced, but the leach rate of carbonate ions is gradually increased first, and when the leach rate reaches a certain value, oyster settlement reaches a maximum value; and along with the continuous increase of the dosage, the reduction amplitude of the calcium ions is large, and the carbonate radicals are possibly reduced, thus the settlement of the oyster larvae is limited by the concentration of the calcium ions, and the settlement is reduced; and 3) For an equivalent substituted mineral admixture, the permeability is increased along with the increase of the dosage, and the $HCO_3^-$ concentration reaches a proper range for the oyster settlement due to the increase of calcium carbonate, which indicates the increase of the settled oyster larvae; and along with the continuous increase of the dosage of the calcium carbonate, the dosage of the mineral admixture is reduced, so the amount of leaching alkali is increased, the carbonate radicals are increased, and the settlement of the oyster larvae is inhibited by excessive alkali and $HCO_3^-$ ions.

Compared with "Study on the Organisms Attachment of Artificial Reefs Constructed with Five Different Cements," by Li Zhenzhen, Gong Pihai, Guan Changtao, et al. in Progress in Fishery Sciences, 2017, 38(5):57-63] (hereinafter comparison document 4), the difference is that:

In the comparison document 4, composite Portland cement, slag Portland cement, pozzolanic Portland cement, fly ash Portland cement and aluminate cement are used. In the present disclosure, low-alkalinity cement is achieved by ordinary Portland cement adding mineral admixtures; silica fume is one of the mineral admixtures and has high activity, and optimum dosage of silica fume can achieve obvious effect on increasing the durability of reinforced concrete in the marine environment. Low-alkalinity cement with the excellent strength and durability can be obtained through optimization design and experiments. Meanwhile, by means of the high penetration resistance characteristic of the silica fume concrete, even if the alkalinity in the coating is high, a large number of oyster larvae still settle to, metamorphosize and grow on the coating surface. The low-alkalinity sulphoaluminate cement is compounded to regulate and control the alkalinity of the emulsified asphalt cement-based coating, and thus an appropriate pH value is provided for oyster larva settlement. In addition, compared to marine plants, oysters, barnacles and other sessile organisms are different in alkali resistance, the environments needed in the settlement period and later period are different, for example, a large number of calcium ions are needed for settlement, metamorphosis and later-period growth of the barnacles and the oysters.

In the comparison document 4, the concrete is used for enriching marine organisms, focusing on the amount and diversity of attached biomass, and the mainly attached organisms are various algae and the like. The research objective of the present disclosure is to induce the settlement of the oysters, but the alkalinity tolerance of oysters and barnacles is higher than that of algae, and a large amount of calcium ions are needed for settlement and metamorphosis of the oysters, so that the two kinds of cement-based material look like the same, but in fact there is a big difference.

In addition, the present disclosure has the unique characteristics and the following beneficial effects:

Dark Substance

The light-shielding characteristic of oyster eyespot larvae is utilized, the emulsified asphalt are doped into the coating, the color of the coating is changed and darkened, the coating is regarded as a dark environment by the oyster larvae, thus the oyster larvae are induced to reach the dark concrete surface, the contact probability of the larvae and the concrete surface are increased, and the induced settlement rate of the oyster larvae is increased. Specifically:

Marine organism researchers carry out the research on the settlement of marine sessile organisms by substrates with different colors in order to cultivation and propagation or eliminate unexpected populations, which belongs to the marine organism discipline. The marine organism discipline is quite different from the marine concrete engineering or cement-based material discipline, they are completely two major disciplines. Through the crossing of the marine sessile organism discipline and the cement-based material discipline, the induced settlement of the oyster larvae by dark coating is realized. In the present disclosure, the emulsified asphalt is added to deepen the surface color of coating so as to promote the settlement of the oyster larvae. Other materials are added in the coating, which can affect the properties of the coating. In the present disclosure, in consideration of the coating of different cements, there is a difference in surface color of the coating. Therefore, the dosage of the dark substances can be determined according to the type and dosage of the cement. The emulsified asphalt also affects the properties of the coating. Most importantly, when the emulsified asphalt is added, if the penetration rates of alkali, Ca2+ and the like in the coating are not controlled, the leached alkali can affect the settlement, metamorphosis and growth of the sessile organism larvae, and when the dosage is greater than a certain value, the settlement amount of the larvae is reduced. In the present disclosure, the penetration resistance of the emulsified asphalt cement-based material is designed and controlled, and the main measures are as follows: control of the dosage and modification. With the increase of the dosage of the emulsified asphalt, the settlement rate of the larvae is increased first, and when the dosage accounts of 0.5%-6% of the cementitious material, the settlement amount of the larvae is maximum, but is slightly increased or kept unchanged later.

Trace Elements

A large amount of zinc is enriched in the oyster body, and zinc concentration is far higher than that in the seawater in which the oyster lives, and meanwhile, the oyster body further contains more Fe, P and K elements. Meanwhile, proper concentration of $Zn^{2+}$ and $K^+$ in the solution can promote early settlement and metamorphosis of the oyster larvae. Therefore, zinc sulfate, potassium sulfate, potassium nitrate, ferric sulfate, zinc phosphate, ammonium nitrate, potassium phosphate, ammonium phosphate, ferric phosphate and calcium phosphate are adopted as the trace elements to be doped into the coating, and these substances are modified to enable the strength and the penetration resistance of the coating to be basically kept unchanged, and thus the induced settlement rate of the oyster larvae is greatly increased. Specifically:

Marine organism researchers carry out the research on the settlement and metamorphosis of different ions to marine sessile organisms in order to clarify oyster settlement mechanisms and cultivation propagation, which belongs to the marine organism discipline. The marine organism discipline is quite different from the marine concrete engineering or cement-based material discipline, they are completely two major disciplines. Through the crossing of the marine sessile organism discipline and the cement-based material discipline, corresponding substances are added into the coating to induce the oyster larvae to settle on the surface of the concrete. Soluble salts have great influence on the properties of the coating, such as influence on early workability, setting time and later strength and penetration resistance. Diatomite is adopted as a carrier in the present disclosure, the inorganic salts are fixed in the diatomite, and thus the influence of the soluble salts on the properties of the coating is reduced. Meanwhile, the effect of improving the properties of the emulsified asphalt cement-based coating by the diatomite is utilized to keep good mechanical property and penetration resistance of the emulsified asphalt cement-based coating when these inducing substances are added. In addition, diatomite serving as the carrier has a slow release effect, thus soluble salt is released slowly, and particularly, the release is kept at a very low rate after the diatomite is soaked in seawater for a certain period of time. Therefore, the above knowledge relates to crossing of the marine sessile organism discipline, chemistry and marine concrete engineering disciplines, and technicians in the fields of cement-based material and engineering or the field of marine organisms cannot obtain the technical characteristics of close correlation between the technology of doping the trace elements into the coating to change the ion content of the trace elements on the surface of the coating and control the permeability of the coating and the concrete with the capability of efficiently inducing the settlement of the oysters through the existing background.

Coating Permeability

The strength and permeability of coating is crucial. Different inducers added into cement-based coating can influence the properties of the coating. Therefore, when different substances are added to promote settlement, metamorphosis and later growth of the oyster larvae, it must be integrally controlled to make sure that the different substances do not have a big impact on the strength and permeability of the coating, and then raw materials are selected according to the compatibility of various raw materials. If the properties of the raw materials cannot meet the actual requirements, the raw materials are modified and then added so as to achieve the expected functions. In practice, although related research is performed by considering the influence of the dosage of calcium on oyster larva settlement, the properties of coating, the water-cement ratio, the dosage of calcium, maintenance and the like are not considered, moreover, the leakage rate of alkali and ions in the coating can be changed due to the change of the permeability of the coating, the poorer the penetration resistance of the coating is, the higher the leakage rate of the alkali and the ions in the coating is, and the leakage rate may be exponentially increased. Therefore, the leached alkali and ions can greatly influence the larvae, a change from promoting settlement to inhibiting settlement may occur, and particularly when the content of cement is large, the situation is more serious. Therefore, when the inducer is added into the coating, it must be guaranteed that the change of the penetration resistance of the coating is within a controllable range, for example, the change cannot exceed 10%. In this way, the induction effects can be compared, otherwise, the influence of single inducer addition or inducer composite addition on the induction effect of the oyster larvae cannot be evaluated.

Only the optimum environment required by settlement, metamorphosis and later growth of marine sessile organisms is mastered, and coating can be designed from the penetration resistance level of the coating instead of only considering the dosage of various raw materials and ignoring the penetration resistance change of the coating. Therefore, the above knowledge relates to crossing of the marine sessile organism discipline, chemistry and marine concrete engineering disciplines, and technicians in the fields of cement-based material and engineering or the field of marine organisms cannot obtain the technical characteristics of close correlation between the integral control technology of the penetration resistance of the coating and the technology of promoting the capability of inducing the settlement of the oysters by the inducer through the existing background.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is modified by a method for treating the 100-500-mesh egg shell powder, coral powder, oyster shell powder and fishbone powder with one or two of acetic acid, silicic acid and sulfurous acid, and treating the 100-500-meshbovine bone powder with one or two of diluted phosphoric acid, sulfuric acid, hydrochloric acid and nitric acid;

Additionally or Alternatively, the calcium carbonate powder is one or more of calcite powder, chalk powder, limestone powder, marble powder, aragonite powder, travertine powder, processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, the chopped fibers are inorganic fibers (12-20 mm in length) and comprise one or more of basalt fibers, alkali-resistant glass fibers and carbon fibers.

Additionally or Alternatively, the lightweight coarse aggregate is one or two of crushed lightweight porous basalt and lightweight ceramsite of which the maximum particle size is less than 20 mm.

Additionally or Alternatively, and the lightweight fine aggregate is one or two of crushed zeolite and lightweight ceramic sand, with a particle size of 0.2 mm to 5 mm.

A preparation method of a cement concrete settlement substrate with a rough surface for oyster comprise the following steps:

S1, designing different roughness according to the characteristic that oyster larvae prefer to settle on the rough substrate surface, and then manufacturing molding formworks with different roughness;

S2, weighing a cementitious material, lightweight coarse aggregate, lightweight fine aggregate, water, a dark pigment, biological calcium powder, calcium carbonate powder, trace elements, chopped fibers and a superplasticizer;

S3, firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and S4, putting a concrete specimen after demolding into a high-concentration $CO_2$ curing chamber for curing for 0.5-5 h according to the situation so as to reduce the alkalinity of the concrete specimen, and then carrying out standard curing for 28 d or curing according to the actual situation.

Thus, the cement concrete settlement substrate with the rough surface for oyster and a good induction effect can be prepared.

The lightweight concrete settlement substrate with the rough surface as described in the specific measure in the step (2) comprises the following material components in percentage by weight: 0.6-3.0% of a dark pigment, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

The lightweight concrete settlement substrate with the rough surface as described in the specific measure in the step (2) comprises the following material components in percentage by weight: 0.4-2.35% of calcium carbonate powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

The lightweight concrete settlement substrate with the rough surface as described in the specific measure in the step (2) comprises the following material components in percentage by weight: 0.4-2.35% of bovine bone powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

The lightweight concrete settlement substrate with the rough surface as described in the specific measure in the step (2) comprises the following material components in percentage by weight: 0.6-3.0% of a modified dark pigment, 0.4-2.35% of calcium carbonate powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

Round holes with the diameter of 3-5 mm are reserved in the cement-based ecological settlement substrate as described in the specific measure in the step (2) during molding, wherein the shape of the settlement substrate is one of the shapes of a slab-shaped settlement substrate, a wave-shaped settlement substrate and a cylindrical settlement substrate.

The concentration period of settlement and metamorphosis of the oyster planktonic larvae in the step (3) is generally May to August in the north and is generally April to October in the south.

The emulsified asphalt cement-based coating as described in the specific measure in the step (4): the emulsified asphalt cement-based coating is prepared in ratio by weight: 1 of a cementitious material, 0.4-0.8 of an emulsified asphalt, 0.5-1.3 of sand, 0.10-0.30 of water, 0.02-0.10 of biological calcium powder, 0.02-0.10 of calcium carbonate powder, 0.01-0.08 of trace elements, 0.08-0.15 of acrylic emulsion, and 0.001-0.008 of a superplasticizer.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, acetic acid aqueous solution, silicic acid and sulfurous acid, and by treating the 100-500-mesh bovine bone powder with one or two of diluted phosphoric acid, sulfuric acid, hydrochloric acid and nitric acid.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the calcium carbonate powder is one or more of calcite, chalk, limestone, marble, aragonite, travertine powder, processed lightweight calcium carbonate, active calcium carbonate, calcium carbonate whiskers and ultrafine lightweight calcium carbonate, with fineness of greater than 200 meshes.

Additionally or Alternatively, acrylic emulsion is polyurethane modified emulsion.

Additionally or Alternatively, the emulsified asphalt is one of cationic emulsified asphalt and anionic emulsified asphalt. The performance indexes of the emulsified asphalt are as follows: the content of evaporation residues is more than 55%, the stability of 5 d is less than or equal to 5%, and the remaining amount on a sieve (1.18 mm sieve) is less than or equal to 0.1%. Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, sand is one or more of river sand, machine-made sand (basalt or granite as parent rock) or desalinated sea sand, with particle size of 0.16 mm-2.36 mm.

Additionally or Alternatively, superplasticizer is one of polycarboxylate superplasticizer and naphthalene-based superplasticizer.

A preparation method of an emulsified asphalt cement-based coating comprises the following steps:

S1, weighing an emulsified asphalt, a cementitious material, sand, water, biological calcium powder, calcium carbonate powder, trace elements, an acrylic emulsion and a superplasticizer;

S2, adding the cementitious material, the biological calcium powder, the calcium carbonate powder, the trace elements and the polycarboxylate superplasticizer powder into a blender mixer, at rotational speed of 1000-1500 r/min, and continuously mixing for 4-8 min, uniformly mixing;

S3, then adding sand into the mixer, adjusting the rotational speed to 500-1000 r/min, and mixing for 2-5 min, and standing for later use;

S4, adding the acrylic emulsion and the emulsified asphalt, uniformly mixing with water, putting into a high-speed stirrer at a speed of 200-500 r/min together with uniformly-mixed material, and mixing for 5-10 min;

Thus, an emulsified asphalt cement-based coating with good induction effect for inducing the settlement of marine sessile organisms for marine engineering surface can be prepared.

An objective of the present disclosure is to invent a coating which can be directly brushed and cured in a humid environment. The coating can induce sessile organisms to be quickly and compactly settled on the concrete surface, achieves the effect of biological corrosion prevention by the settlement characteristic of oysters, and further achieves the purposes of purifying water body and restoring ecology by inducing the sessile organisms to settle in a large scale. The present disclosure solves the problems of limited effect of corrosion prevention measures, short service time, high construction cost and the like in a tidal range area and an underwater area of marine concrete engineering, and solves the problem that there is ecological deterioration, and it is urgently needed to perform marine ecological restoration.

The objective of the present disclosure is realized as follows: the low-alkalinity cementitious material, acrylic emulsion and the superplasticizer are used, and emulsified asphalt, modified biological calcium powder, calcium carbonate powder and trace elements are added into the coating, thus the prepared emulsified asphalt cement-based coating has high capability of inducing settlement and metamorphosis of oyster larvae and achieves the effect of compact and uniform settlement of oysters; the durability of the concrete structure is guaranteed by the settlement characteristic of the oysters; and no pollution is caused to the marine environment.

The present disclosure further comprises the following structural characteristics:

the emulsified asphalt cement-based coating is prepared in ratio by weight: 1 of a cementitious material, 0.4-0.8 of an emulsified asphalt, 0.5-1.3 of sand, 0.10-0.30 of water, 0.02-0.10 of biological calcium powder, 0.02-0.10 of calcium carbonate powder, 0.01-0.08 of trace elements, 0.08-0.15 of acrylic emulsion, and 0.001-0.008 of a superplasticizer.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, acetic acid aqueous solution, silicic acid and sulfurous acid, and by treating the 100-500-mesh bovine bone powder with one or two of diluted phosphoric acid, sulfuric acid, hydrochloric acid and nitric acid.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the calcium carbonate powder is one or more of calcite, chalk, limestone, marble, aragonite, travertine powder, processed lightweight calcium carbonate, active calcium carbonate, calcium carbonate whiskers and ultrafine lightweight calcium carbonate, with fineness of greater than 200 meshes.

Additionally or Alternatively, acrylic emulsion is polyurethane modified emulsion.

Additionally or Alternatively, the emulsified asphalt is one of cationic emulsified asphalt and anionic emulsified asphalt. The performance indexes of the emulsified asphalt are as follows: the content of evaporation residues is more than 55%, the stability of 5 d is less than or equal to 5%, and the remaining amount on a sieve (1.18 mm sieve) is less than or equal to 0.1%.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, sand is one or more of river sand, machine-made sand (basalt or granite as parent rock) or desalinated sea sand.

Additionally or Alternatively, the superplasticizer is one of polycarboxylate superplasticizer and naphthalene-based superplasticizer.

A cement-based coating for inducing the settlement of marine sessile organisms for marine engineering surface and preparation method comprises the following steps:

S1, weighing a cementitious material, sand, water, a dark pigment, biological calcium powder, calcium carbonate powder, trace elements, lignocellulose, dispersible adhesive powder and a superplasticizer;

S2, adding the cementitious material, the dark pigment, the biological calcium powder, the calcium carbonate powder and the trace elements into a blender mixer, at rotational speed of 1000-1500 r/min, and continuously mixing for 2-5 min, uniformly mixing;

S3, then adding sand, lignocellulose and dispersible adhesive powder into mixer, at rotational speed of 500-1000 r/min, and mixing for 5-10 min;

S4, adding polycarboxylate superplasticizer powder fully dissolved in water and the material mixed enough into high-speed mixer, at rotational speed of 500-1000 r/min, and mixing for 5-10 min;

Thus, a cement-based coating with good induction effect for inducing the settlement of marine sessile organisms for marine engineering surface can be prepared.

The present disclosure has the beneficial effects that:

in the present disclosure, discarded construction blocks generated by buildings, infra structures and the like are used for building the marine ecological breakwater, which fully utilizes the discarded concrete and meets the characteristics of discarded object recycling and energy conservation; and moreover, the settlement substrate for oysters is induced to grow, thus the water body is purified, coastline erosion is prevented, biodiversity is maintained, carbon sequestration is realized, marine acidification is relieved; and the ecological restoration ability is achieved.

At present, there is a lack of a green and economical method for realizing the durability of marine concrete or the ecologicalization of marine concrete engineering. Oysters called marine "ecological engineers" have the functions of compacting the surface of the concrete structure, improving the ecological environment and the like. The emulsified asphalt cement-based coating for inducing sessile organisms in the present disclosure has the characteristics of quickly inducing the settlement and metamorphosis of the sessile organisms and promoting long-term growth of the sessile organisms, and also has the characteristics of being simple to construct and easy to paint. The emulsified asphalt cement-based coating can be applied to newly-built marine engineering, especially a large number of on-service marine engineering. The emulsified asphalt cement-based coating cannot only improve the durability of a reinforced concrete structure, but also can simply economically realize the restoration of the marine ecological environment. Therefore, the application of the marine sessile organisms in corrosion prevention of on-service reinforced concrete structure is greatly expanded, and the emulsified asphalt cement-based coating can also be widely applied to marine ecological environment restoration engineering.

Therefore, the above knowledge relates to crossing of the marine sessile organism discipline, marine plants and marine concrete engineering disciplines, and technicians in the fields of cement-based material and engineering or the field of marine organisms cannot obtain the technical characteristics of close correlation between the technology of mixing the emulsified asphalt into the coating to change the color, the technology of modifying the bovine bone powder, the technology of grinding and the technology of controlling the permeability of the coating and the coating with the capability of efficiently inducing the settlement of the oysters and high durability coating from the comparison documents 1-2. The technicians also cannot obtain the technical characteristics of close correlation between the balance between the reduction of the alkalinity of the coating and the concentration of calcium ions and the settlement of the marine sessile organisms from the comparison document 4.

Although examples of the present disclosure are shown and described, it will be understood by those skilled in the art that various changes, modifications, and substitutions can be made in these examples without departing from the principle and spirit of the present disclosure and modifications, the scope of the present disclosure is defined by the appended claims and their equivalents.

The invention claimed is:

1. A construction method for marine ecological engineering by discarded concrete blocks, comprising:
   (1) surveying a sea area at a location for constructing or modifying a breakwater structure: surveying dominant species of oysters in the sea area and whether the oysters are attached, surveying air temperature, seawater temperature, dissolved oxygen, plankton, total dissolved inorganic nitrogen, active phosphate, active silicate, $Ca^{2+}$, $Zn^{2+}$, $K^+$ for the sea area at different seasons, and surveying typhoon times, strength over the years;
   (2) preparing a lightweight concrete settlement substrate with a rough surface for oyster, wherein the shape of the lightweight concrete settlement substrate for oyster is one of the shapes of a flat settlement substrate, a wave-shaped settlement substrate and a cylindrical settlement substrate;
   (3) quantitatively collecting and cultivating oyster larvae: placing the settlement substrate in a larva collection area of a first local sea area, where the swimming larvae are mainly in metamorphosis period, stopping collecting the larvae once the amount of the settled oyster larvae is 15-25 larvae/100 $cm^2$, and moving the settlement substrate to a second local sea area for floating cultivation;
   (4) treating surfaces of discarded concrete blocks: evaluating the alkalinity, the internal ion concentration and the permeability of the discarded concrete; if the pH is more than 12.5, reducing the alkalinity, and spraying or brushing an emulsified asphalt cement-based coating with high bonding strength and high induction for oyster to settle on the surfaces of the discarded concrete blocks;
   (5) placing discarded concrete blocks during the concentration period of settlement and metamorphosis of oyster planktonic larvae in the second local sea area, adopting a dispersed placement method, placing the discarded concrete blocks with volume of more than 1 $m^3$ individually;
   (6) placing the oyster settlement substrate in site: conveying the oyster settlement substrate in which the gonad of oysters develops into mature stage in the step (2) to the sea area for constructing the breakwater, placing one lightweight concrete oyster settlement substrate with the rough surface on single discarded concrete block or discarded concrete block pile and fixing the lightweight concrete settlement substrate for oyster on single discarded concrete block or discarded concrete block pile through a rope; in addition, feeding algae or replenishing nutritive salts if necessary according to the planktonic condition of the sea area; and
   (7) monitoring and managing the state of larval settlement: monitoring the settlement condition of oyster larvae on the rock surface; when the larval settlement density is 30 to 40 larvae/100 $cm^2$, moving away the oyster settlement substrate, and monitoring ecological condition of the breakwater.

2. The construction method for marine ecological engineering by discarded concrete blocks according to claim 1, wherein the settlement substrate for oyster is prepared from the following components in percentage by weight: 21.8-34.5% of a cementitious material, 24.6-37.5% of lightweight coarse aggregate, 15.8-29.6% of lightweight fine aggregate, 8.4-16.4% of water, 0.6-3.0% of a dark pigment, 0.4-2.0% of biological calcium powder, 0.4-2.0% of calcium carbonate powder, 0.2-1.8% of trace elements, 0.15-1.5% of chopped fibers and 0.03-0.18% of a superplasticizer.

3. The construction method for marine ecological engineering by discarded concrete blocks according to claim 2, wherein in the raw materials of the settlement substrate for oyster, the dark pigment is one or two of iron oxide black, nigrosine, carbon black, antimony sulfide, iron oxide red and organic pigment red; the pigments are modified according to the influence degree on the concrete properties; and one of transparent resin, organosilicon, dimethylsiloxane and a superhydrophobic material is used for modification treatment; the biological calcium powder is bovine bone powder; the biological calcium carbonate powder comprises one or a combination of more of oyster shell powder, fishbone powder, egg shell powder and coral powder, with fineness of 100-1000 meshes; the 100-500-mesh egg shell powder, coral powder, oyster shell powder and fishbone powder are treated with one or two of acetic acid, silicic acid and sulfurous acid;

and the 100-500-mesh bovine bone powder is treated with one or two of diluted phosphoric acid, sulfuric acid, hydrochloric acid and nitric acid;

the calcium carbonate powder is one or more of calcite powder, chalk powder, limestone powder, marble powder, aragonite powder, travertine powder, processed lightweight calcium carbonate, active calcium carbonate, calcium carbonate whiskers and ultrafine lightweight calcium carbonate, with a fineness of greater than 200 meshes;

the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties; and for eutrophic areas, substances containing nitrogen and phosphorus elements are not selected;

the cementitious material is one of mineral admixture added Portland cement, sulphoaluminate cement and an alkali-activated cementitious material; the mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash;

the lightweight coarse aggregate is one or two of crushed lightweight porous basalt and lightweight ceramsite of which the maximum particle size is less than 20 mm; the lightweight fine aggregate is one or two of crushed zeolite and lightweight ceramic sand, with a particle size of 0.2 mm to 5 mm;

the chopped fibers are inorganic fibers (12-20 mm in length) and comprise one or more of basalt fibers, alkali-resistant glass fibers and carbon fibers;

wherein preparing the lightweight concrete settlement substrate comprises:

S1, designing different roughness according to the characteristic that oyster larvae prefer to settle on rough substrate surface, and then manufacturing molding form works with different roughness;

S2, weighing a cementitious material, lightweight coarse aggregate, lightweight fine aggregate, water, a dark pigment, biological calcium powder, calcium carbonate powder, trace elements, chopped fibers and a superplasticizer;

S3, firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and S4, putting a concrete specimen after demolding into a high-concentration CO2 curing chamber for curing for 0.5-5 h according to the situation so as to reduce the alkalinity of the concrete specimen, and then carrying out standard curing for 28 d or curing according to the actual situation, thus obtaining the concrete settlement substrate with the rough surface for oyster and a good induction effect.

4. The construction method for marine ecological engineering by discarded concrete blocks according to claim 1, wherein the emulsified asphalt cement-based coating is prepared in ratio by weight: 1 of a cementitious material, 0.4-0.8 of an emulsified asphalt, 0.5-1.3 of sand, 0.10-0.30 of water, 0.02-0.10 of biological calcium powder, 0.02-0.10 of calcium carbonate powder, 0.01-0.08 of trace elements, 0.08-0.15 of acrylic emulsion, and 0.001-0.008 of a superplasticizer.

5. The construction method for marine ecological engineering by discarded concrete blocks according to claim 1, wherein in the raw materials of the emulsified asphalt cement-based coating, the biological calcium powder is bovine bone powder; the biological calcium carbonate powder comprises one or a combination of more of oyster shell powder, fishbone powder, egg shell powder and coral powder, with fineness of 100-1000 meshes;

wherein the biological calcium powder is modified by a method for treating the 100-500-mesh egg shell powder, coral powder, oyster shell powder and fishbone powder with one or two of acetic acid, silicic acid and sulfurous acid, and treating the 100-500-meshbovine bone powder with one or two of diluted phosphoric acid, sulfuric acid, hydrochloric acid and nitric acid;

wherein the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with a fineness of greater than 200 meshes;

wherein the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties; and for eutrophic areas, substances containing nitrogen and phosphorus elements are not selected;

wherein the emulsified asphalt is one of cationic emulsified asphalt and anionic emulsified asphalt; the performance indexes of the emulsified asphalt are as follows: the content of evaporation residues is more than 55%, the stability of 5 d is less than or equal to 5%, the sieve diameter is 1.18 mm, and the remaining amount on the sieve is less than or equal to 0.1%; wherein the cementitious material is one of mineral admixture added Portland cement, sulphoaluminate cement and an alkali-activated cementitious material; the mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash;

wherein the sand is one or more of river sand, machine-made sand or desalinated sea sand, with a particle size of 0.16 mm to 2.36 mm; and wherein the superplasticizer is one of polycarboxylate superplasticizer and naphthalene-based superplasticizer.

6. The construction method for marine ecological engineering by discarded concrete blocks according to claim 1, wherein the concentration period of settlement and metamorphosis of oyster planktonic larvae, is April to October.

7. The construction method for marine ecological engineering by discarded concrete blocks according to claim 1, where in raw materials of the settlement substrate for oyster, comprise, by weight, 0.6-3.0% of a dark pigment, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

8. The construction method for marine ecological engineering by discarded concrete blocks according to claim 1, wherein the settlement substrate for oyster is specifically prepared from, by weight, 0.4-2.35% of calcium carbonate powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

9. The construction method for marine ecological engineering by discarded concrete blocks according to claim 1, wherein the settlement substrate for oyster is specifically prepared from, by weight, 0.4-2.35% of bovine bone powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

10. The construction method for marine ecological engineering by discarded concrete blocks according to claim 1, wherein the settlement substrate for oyster is specifically prepared from, by weight, 0.6-3.0% of a modified dark pigment, 0.4-2.35% of bovine bone powder, 21.8-34.5% of a cementitious material, 24.6-37.5% of lightweight coarse aggregate, 15.8-29.6% of lightweight fine aggregate, 8.4-16.4% of water, and 0.03-0.18% of a superplasticizer.

* * * * *